Figure 1:
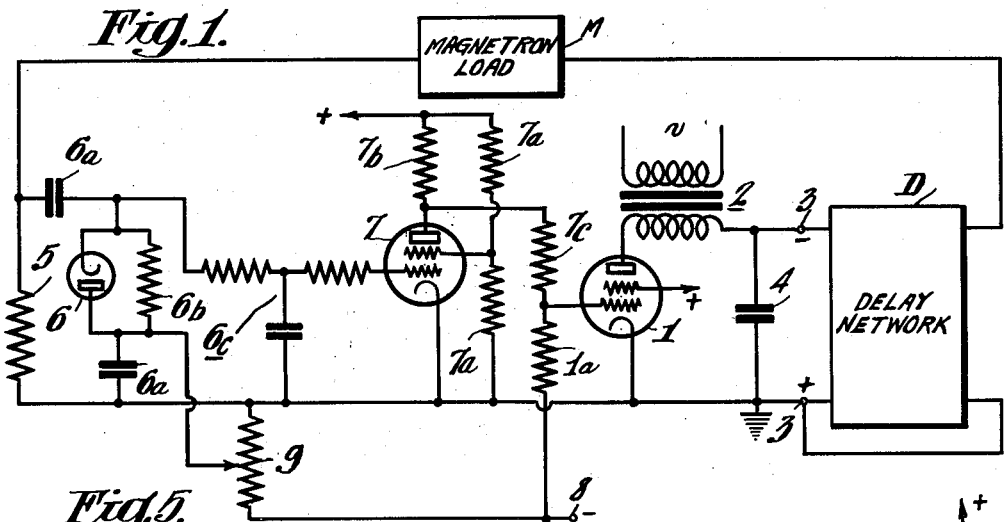

Aug. 29, 1950  E. L. C. WHITE ET AL  2,520,617
ELECTRIC SUPPLY CIRCUITS
Filed Sept. 18, 1945

INVENTORS
Eric Lawrence Casling White
Eric Arthur Nind
& Leonard Reginald Joffre Johnson
BY H. G. Grover
ATTORNEY Patented Aug. 29, 1950

2,520,617

UNITED STATES PATENT OFFICE 2,520,617

ELECTRIC SUPPLY CIRCUITS

Eric Lawrence Casling White, Iver, Eric Arthur Nind, Ruislip, and Leonard Reginald Joffre Johnson, Harlington, England, assignors to Electric and Musical Industries, Limited, a British company Application September 18, 1945, Serial No. 617,006
In Great Britain September 10, 1943

Section 1, Public Law 690, August 8, 1946
Patent expires September 10, 1963

8 Claims. (Cl. 250—27)

The present invention relates to electric supply circuits for feeding current or voltage intermittently to a load. The invention has particular but not exclusive reference to arrangements for deriving from an alternating current source a current of stabilized value.

The invention has been developed in connection with the provision of a suitable source of supply for charging a delay network which is discharged through a magnetron valve for producing pulses of high frequency energy. With such an arrangement it is important to employ an arrangement in which the peak current through the magnetron is as nearly as possible constant so that the mode of operation of the magnetron during each pulse is the same. The operating frequency of the magnetron is thus stabilized.

According to one feature of the present invention an electric supply circuit is provided for feeding current or voltage intermittently to a load, comprising a rectifier for measuring the amplitude of the intermittent current or voltage fed to said load and means controlled by the output of said rectifier for maintaining the amplitude of said intermittent current or voltage fed to said load substantially constant. Where the electric supply circuit is constructed so as to be fed from an alternating current source, a grid-controlled rectifier is preferably provided for rectifying the current from said source for feeding to a device such as a delay network which serves to feed current intermittently to said load which may be a magnetron, the grid-controlled rectifier being controlled by a bias potential derived from the rectifier which measures the current or voltage fed to said load.

Where the grid-controlled rectifier has a screening electrode the invention also provides various means for preventing or reducing the flow of current to the screen when the anode of said grid-controlled rectifier is non-conducting and without causing substantial reduction in the gain thereof.

Among the objects of the invention are to provide an improved method of and means for regulating a power supply for an intermittently energized load. Another object of the invention is to provide improved means for controlling the voltage or current applied to an itnermittently energized load. A further object of the invention is to provide an improved voltage or current regulating circuit for controlling the energy applied to an intermittently energized load. An additional object is to provide an improved regulating circuit responsive to load current for controlling the energy applied to an intermittently energized load. Another object is to provide an improved power control circuit including a peak detector responsive to load current for controlling the impedance of a rectifier energizing a load. A still further object of the invention is to provide improved means for controlling screen current in a screen grid type rectifier connected to an intermittently energized load, and for controlling the impedance of said rectifier in response to a peak detector responsive to the load current.

In order that the invention may be clearly understood and readily carried into effect the same will now be described more in detail with reference to the accompanying drawings in which:

Figure 1 is a schematic circuit diagram of an electric supply circuit in accordance with the invention and Figures 2, 3, 4 and 5 are schematic circuit arrangements for reducing or preventing the flow of current to the screening grid in the rectifier valve of the circuit arrangement shown in Figure 1 when the anode of the valve is non-conducting.

Referring to Figure 1, the circuit therein shown comprises a rectifier valve 1 arranged to be fed from a source of alternating current connected to the primary winding of the transformer 2, this valve being arranged to furnish at terminals 3 a negative output voltage which is smoothed by the condenser 4. The load circuit connected across the terminals 3 may comprise a delay network D which is charged for supplying current pulses to a magnetron valve M, the current through which also passes through a resistance 5 shown at the left-hand side of the figure.

Connected across the resistance 5, but isolated therefrom in respect of D. C. by blocking condensers 6a, is a peak rectifier 6, having a load resistance 6b. The output of the rectifier 6 is fed through smoothing elements 6c to an amplifier valve 7, shown as a screen grid valve, the output of which is applied to the control electrode of the valve 1 in such a sense as to increase the negative bias on the valve 1 should the peak voltage developed across the resistance 5 increase.

The valve 7 is shown as having a screening grid connected to a point on a potentiometer formed by resistances 7a connected between the positive terminal of the high-tension supply for the valve 7 and earth in well understood manner. The anode load resistance of the valve 7 is shown at 7b. The output of the valve 7 is fed to the control electrode of valve 1 through a resistance 7c, the output circuit of valve 7 being completed through a resistance 7a the end of which is maintained negative with respect to earth by connection to a suitable terminal 8.

The value of the peak voltage across the resistance 5 at which the control on the rectifier 1 starts to become effective, is determined by adjustment of a negative bias from potentiometer 9, the total grid-cathode voltage on amplifier 7 being the algebraic sum of the bias and the output of rectifier 6.

It will be seen that in the arrangement of Figure 1, should the peak current through the resistance 5 increase for any reason, the output of rectifier 6 will increase and the potential applied to the control electrode of valve 7 will become more positive causing the current through valve 7 to rise so that the anode of the valve will become more negative. Thus the bias on the control electrode of valve 1 will become more negative and the current passed by valve 1 will be decreased thus decreasing the output of the valve.

If peak current through resistance 5 decreases, the output of valve 1 will increase.

In the arrangement shown in Figure 1 the amplifier valve 7 may be a pentode. However, any suitable amplifier valve may be used at this point, and if no amplification of the control potential derived from the rectifier 6 is required the amplifier valve 7 may be dispensed with, the polarity of the control potential being suitably altered.

The rectifier valve 1 of Figure 1 is shown as having a screening grid. The valve may also include a suppressor grid, not shown. The use of such a valve is to be preferred in the particular case referred to due to the fact that the current passed by the valve is dependent practically entirely on the potentials of the control grid and screening grid of the valve, the current being varied by adjustment of the potential of either of these electrodes, and for practically the whole time that the anode of the valve is positive with respect to the cathode, the full valve current flows to the anode. Thus the valve 1 will operate to feed rectified current pulses of substantially square waveform, and will operate to feed a large amount of energy to the load circuit. Moreover, a valve having a screening grid can be subjected to a relatively high reverse potential without danger of breakdown. However, if desired it is possible to employ for the valve 1 a triode valve and if a triode valve is used this preferably has a topcap anode to withstand the high back voltages which occur in operation.

If the rectifier valve 1 has a screening grid as shown in Figure 1 it is desirable to provide means for preventing or reducing the flow of current to the screening grid when the anode of valve 1 is non-conducting, that is to say, when the potential of the anode of the valve 1 becomes zero or negative with respect to the cathode of the valve. Such means might comprise suitable potential dropping resistances connected between the screening grid and the positive source of potential to which the screening grid is connected, but such resistances seriously reduce the gain of the valve. Means for reducing or preventing the flow of current to the screening grid without seriously reducing the gain of the valve 1 are shown in Figures 2, 3, 4 and 5 in which elements corresponding to those shown in Figure 1 are indicated by like reference numerals.

Figure 2:
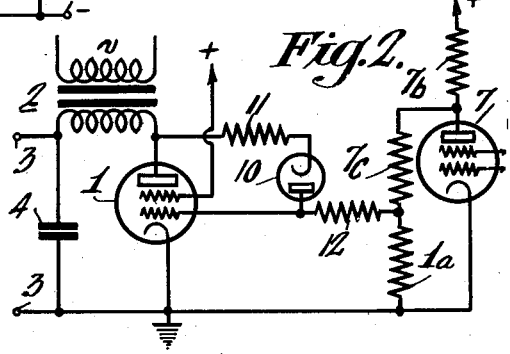

In the arrangement shown in Figure 2 there is connected between the anode and the control electrode of valve 1 a rectifier 10, shown as a diode, which is connected in series with resistances 11 and 12, the rectifier 10 being arranged to pass current when the anode of valve 1 becomes negative with respect to the control grid thereof. Under these conditions the control grid of the valve 1 attains a negative potential which is determined by the ratio of resistances 11 and 12 and the flow of current to the screening grid of the valve 1 is substantially prevented. The arrangement of Figure 2 is satisfactory if the frequency of the current fed to the valve 1 is low, but if this frequency is too high, the capacity to earth of the rectifier 10 in conjunction with resistance 11 serves to produce such a large phase shift in the voltage applied to the control grid of the valve 1 that the arrangement cannot be employed.

Figure 5:
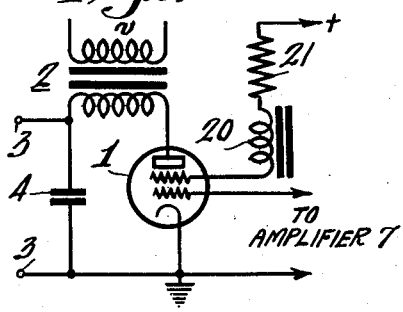
Figure 4:
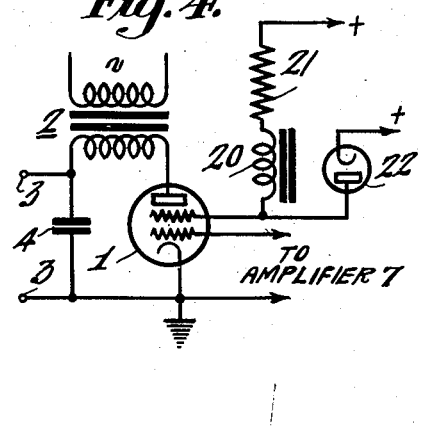
Figure 3:
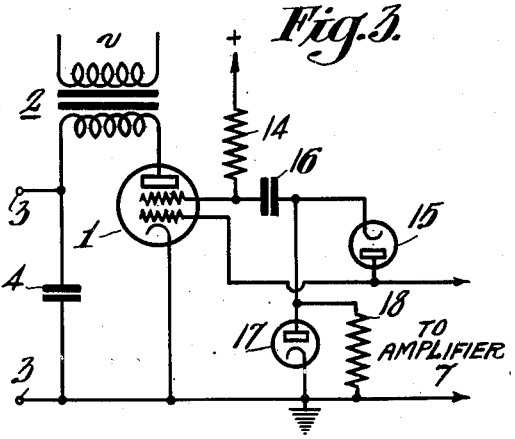

The alternative arrangements of Figures 3, 4, and 5 are more suitable for higher frequencies.

In the arrangement of Figure 3 the screening grid of valve 1 is fed with positive potential through a resistance 14, and is connected to the control grid of the valve through a rectifier 15, shown as a diode having its anode connected to the control grid, a suitable blocking condenser 16 being interposed between the rectifier 15 and the screening grid of the valve.

When the anode of valve 1 becomes non-conducting the current of the screen grid of the valve rises and the potential of the screening grid thereby falls due to the increase in the voltage drop over resistance 14. Thus a negative impulse is applied to the rectifier 15 causing the cathode of the rectifier 15 to become negative with respect to the anode so that the rectifier conducts. Thus the potential of the control grid of valve 1 is reduced thereby limiting the current in the valve as desired without employing resistance 14 of large value.

When the anode of valve 1 becomes conducting, the screen grid current drops, the screen grid potential rises, and the diode 15 again becomes non-conducting, thus allowing the magnetron current control of the grid potential of valve 1 to become effective. Since the said grid potential never needs to be positive with respect to earth, it is sufficient if the cathode of diode 15 rises to earth potential. It is also desirable that it should not rise beyond the necessary amount or the amount of its negative travel in the other half of the cycle will be reduced, and the limitation of screen current of valve 1 will be less effective. To ensure this, a diode 17 is provided with its cathode earthed and its anode connected to the cathode of diode 15. A leak resistance 18 is preferably connected across diode 17. Diode 17 and leak 18 can be regarded as providing D. C. restoration for the square pulse waveform transmitted from the screen grid of valve 1 through condenser 16.

In the arrangement of Figure 4 the screening grid of the valve 1 is connected to a source at higher positive potential than that which the screening grid of the valve is required to be when the anode of the valve 1 is conducting, this connection being effected through an inductance 20 and resistance 21 in series. The screening grid is also connected through a rectifier 22 shown as a diode to a source of positive potential which sets an upper limit to the operating potential for the screening grid, this limitation being effected through rectifier 22 having its anode connected to the screening grid. With this arrangement the value of resistance 21 is chosen so that when the anode of the valve 1 is non-conducting and the current to the screening grid rises, the resistance 21 limits the rise in current to such a value that over-heating of the screening grid is prevented. When the anode of valve 1 becomes conducting the current through the screening grid of the valve 1, inductance 20 and resistance 21 falls causing the potential of the screening grid to rise, the rapidity of the rise being increased due to the action of the inductance 20. Accordingly the anode of diode 22 becomes positive with respect to the cathode and the diode 22 becomes conductive, placing the screening grid in connection with its source of operating potential so that the screening grid is maintained at the desired constant potential, while the anode of the valve remains conducting.

In the arrangement of Figure 4 the inductance 20 may be omitted if the resistance 21 has such a value that a sufficient rise of potential on the screening grid of valve 1 occurs when the anode of the valve becomes conducting.

The arrangement of Figure 5 is similar to the arrangement of Figure 4 except that the rectifier 22 is omitted and the screening grid of the valve 1 is only connected to a source of positive potential through the inductance 20 and resistance 21 in series. In this case the resistance 21 serves to limit the current flowing through the screening grid when the anode of valve 1 is non-conducting and the inductance 20 serves to cause the potential of the screening grid to become rapidly more positive when the anode of valve 1 commences to conduct.

It will be appreciated that details of the circuit arrangements shown above may be varied, for example, instead of varying the potential of the control grid of valve 1, the potential of the screening grid could be varied to control the output of the valve and while the rectifiers 10, 15, 17 and 22 of Figures 2, 3 and 4 have been shown as diodes, other suitable rectifiers, for example, selenium rectifiers, may be employed.

While, in the above described arrangements, the peak value of the current is stabilized, it will be appreciated that the invention may be embodied in an arrangement in which the mean value of the current or the peak or the mean value of a voltage is stabilized, the time constant of the smoothing circuit associated with the rectifier 6 being suitably chosen according to the purpose in view.

Having now particularly described and ascertained the nature of our said invention and in what manner the same is to be performed, we declare that what we claim is:

1. An electric supply circuit for intermittently energizing a load, comprising a peak rectifier coupled to said load for measuring the intermittent energy fed to said load and means including a screen grid rectifier controlled by and coupled to the output of said peak rectifier and serially connected with said load for maintaining substantially constant the peak amplitude of said intermittent energy fed to said load.

2. An electric supply circuit for intermittently energizing a load comprising a peak detector coupled to said load and responsive to the intermittent energy applied to said load, a grid-controlled rectifier connected in series with said load, said rectifier also having a screen electrode, means for biasing said screen electrode, and means including an amplifier responsive to the output of said peak detector for controlling the impedance of said rectifier for maintaining substantially constant the amplitude of said intermittent energy applied to said load.

3. Apparatus according to claim 2 wherein said load is a magnetron tube, a delay network energized by current derived from said rectifier, and means including said delay network for intermittently pulsing said tube.

4. Apparatus according to claim 2 wherein said grid-controlled rectifier includes a screen electrode, and a second rectifier connected between the anode and the control grid of said grid-controlled rectifier, said second rectifier being arranged to conduct when the anode of said grid-controlled rectifier becomes the same or a lower potential than said control grid whereby the screen current is substantially reduced.

5. A circuit according to claim 2 wherein said grid-controlled rectifier includes a screen electrode, a source of bias potential, impedance means connecting said screen electrode to said bias potential source, and a second rectifier connecting said screen electrode to the control grid of said grid-controlled rectifier, whereby said second rectifier conducts when the anode of said grid-controlled rectifier becomes non-conducting to reduce the potential of said control grid, thereby reducing the screen electrode current.

6. A circuit according to claim 2 wherein said grid-controlled rectifier includes a screen electrode, a source of bias potential, impedance means connecting said screen electrode to said bias potential source, a second rectifier connecting said screen electrode to the control grid of said grid-controlled rectifier, whereby said second rectifier conducts when the anode of said grid-controlled rectifier becomes non-conducting to reduce the potential of said control grid, thereby reducing the screen electrode current, and a third rectifier having its anode connected to the cathode of said second rectifier and having its cathode biased at a low potential to limit the rise of potential of said cathode of said second rectifier when said second rectifier is rendered non-conducting.

7. An electric supply circuit according to claim 2 wherein said grid-controlled rectifier includes a screen electrode, a source of higher positive potential than is required by said screen electrode when the anode of said grid-controlled rectifier is conducting, impedance means connecting said screen electrode to said higher potential source, a second rectifier, means connecting said screen electrode of said grid-controlled rectifier to the anode of said second rectifier, means for biasing the cathode of said second rectifier to a positive potential whereby when said grid-controlled rectifier is conducting said second rectifier conducts to connect said screen electrode to said positive potential source and when said anode of said grid-controlled rectifier ceases to conduct said impedance limits the rise of current to said screen electrode.

8. An electric supply circuit according to claim 2 wherein said grid-controlled rectifier includes a screen electrode, and including a source of positive potential, and an impedance comprising an inductance and a resistance serially connected between said positive potential source and said screen electrode, said resistance limiting the current to said screen electrode when the anode of said grid-controlled rectifier is non-conducting and said inductance providing rapid increase in said screen potential when said anode commences to conduct.

ERIC LAWRENCE CASLING WHITE.
ERIC ARTHUR NIND.
LEONARD REGINALD JOFFRE JOHNSON.

REFERENCES CITED

The following references are of record in the file of this patent:

UNITED STATES PATENTS

| Number | Name | Date |
|---|---|---|
| 2,095,742 | Haller | Oct. 12, 1937 |
| 2,103,619 | Hallmark | Dec. 28, 1937 |
| 2,113,220 | Power | Apr. 5, 1938 |
| 2,149,080 | Wolff | Feb. 29, 1939 |
| 2,405,069 | Tonks | July 30, 1946 |